US006807158B2

(12) United States Patent
Krishnamurthy et al.

(10) Patent No.: US 6,807,158 B2
(45) Date of Patent: Oct. 19, 2004

(54) METHOD AND APPARATUS FOR DETERMINING POSITION AND TRAJECTORY OF GATEWAYS TO OPTIMIZE PERFORMANCE IN HYBRID NON-TERRESTRIAL-TERRESTRIAL MULTI-HOP MOBILE NETWORKS (75) Inventors: Srikanth Krishnamurthy, Riverside, CA (US); Mohin Ahmed, Los Angeles, CA (US); George D. Kondylis, Palo Alto, CA (US)

(73) Assignee: HRL Laboratories, LLC, Malibu, CA (US)

( * ) Notice: Subject to any disclaimer, the term of this patent is extended or adjusted under 35 U.S.C. 154(b) by 97 days.

(21) Appl. No.: 09/924,958

(22) Filed: Aug. 7, 2001

(65) Prior Publication Data

US 2003/0053424 A1 Mar. 20, 2003

(51) Int. Cl.[7] .............................................. H04B 7/185
(52) U.S. Cl. ...................... 370/316; 370/331; 370/338; 455/13.1
(58) Field of Search ................................. 370/316, 328, 370/338, 401, 331; 455/427, 430, 11.1, 12.1, 13.1, 13.4

(56) References Cited

U.S. PATENT DOCUMENTS

| 4,639,937 | A | * | 1/1987 | McRae et al. | ............... | 370/316 |
| 5,081,703 | A | | 1/1992 | Lee | | |
| 5,592,481 | A | * | 1/1997 | Wiedeman et al. | .......... | 370/316 |
| 5,594,780 | A | * | 1/1997 | Wiedeman et al. | .......... | 370/316 |
| 5,594,807 | A | * | 1/1997 | Liu | .............................. | 382/128 |
| 5,812,932 | A | * | 9/1998 | Wiedeman et al. | ......... | 455/12.1 |
| 6,160,804 | A | * | 12/2000 | Ahmed et al. | ............... | 370/349 |
| 6,215,776 | B1 | * | 4/2001 | Chao | ........................... | 370/316 |
| 6,370,126 | B1 | * | 4/2002 | De Baere et al. | ........... | 370/316 |

FOREIGN PATENT DOCUMENTS

EP        0 750 406 A    12/1996

OTHER PUBLICATIONS

K.Y. Eng, et al. "BAHAMA: A Broadband Ad–Hoc Wireless ATM Local–Area Network" IEEE International Conference On Communications, 1995, ICC '95 Seattle, "Gateway To Globalization", vol. 2, 1995, pp. 1216–1223, XP002219559.
Rein A. et al. "Inactivation of Murine Leukemia Virus by Compounds that react with the Zinc Finger in the Viral Nucleocapsid Protein" Journal of Birology, The American Society For Microbiology, US, vol. 70, No. 8, Aug. 1996, pp. 4966–4972, XP001036925.
N Abramson, "Development of ALOHANET", IEEE Transactions on Information Theory, vol. IT–31, pp. 119–123, Mar. 1985.

* cited by examiner

Primary Examiner—Chi Pham
Assistant Examiner—Keith M. George
(74) Attorney, Agent, or Firm—Tope-McKay & Associates (57) ABSTRACT

A wireless hybrid network consisting at least one satellite 118 and a plurality mobile ad hoc nodes 104. The nodes 104 are assumed to be clustered into mobile groups 102 within the footprint of the satellite 118, and the objective is to enable reliable communications between the various nodes 104. At least one relatively powerful gateway 110, also mobile, is deployed for each cluster 102 of nodes to facilitate communication with a LEO or GEO satellite 118. The environment is characterized by the presence of terrestrial barriers 100 or other severe channel impairments. One of the goals of the invention is to provide a mechanism by which a mobile gateway 112 can change its position or define its trajectory based on the position and loading of the nodes 104 in an ad hoc network, so as to optimize certain pre-defined performance criterion, such as power, overhead, throughput.

19 Claims, 7 Drawing Sheets

An arbitrary group comprising nodes and gateways within the footprint of a LEO or GEO satellite. Two overlapping domains are shown.

METHOD AND APPARATUS FOR DETERMINING POSITION AND TRAJECTORY OF GATEWAYS TO OPTIMIZE PERFORMANCE IN HYBRID NON-TERRESTRIAL-TERRESTRIAL MULTI-HOP MOBILE NETWORKS

This invention was made with Government support under Contract/Grant N00014-99-C-0322, awarded by the Department of the Navy. The Government has certain rights in the invention.

TECHNICAL FIELD

The present invention relates generally to wireless networks and more particularly to performance optimization in hybrid, non-terrestrial-terrestrial multi-hop mobile wireless networks.

BACKGROUND

Existing wireless networks often fail to adequately perform in harsh terrestrial environments. Many performance shortcomings are related to inter-nodal terrestrial barriers. These barriers commonly result in one or more nodes becoming isolated from other nodes in the network. This is an undesirable situation, resulting in inefficient use of personnel, sensor arrays, or other aspects of the node based networking system. In an attempt overcome the problems associated with isolated nodes, artisans have suggested using nodes that have an airborne or satellite uplink. These nodes are often referred to as gateway nodes, in part because they serve as gateways to an airborne platform or a satellite. Thus, a determinable number of nodes are designated as gateway nodes, and these nodes provide bi-directional terristerial-non-terrestrial communication. In this way remote and isolated nodes are able to maintain contact with the main network.

Existing satellite-mobile ad hoc network hybrid systems generally assign static positions for gateways or define gateway trajectories using a heuristic approach. One of the main disadvantages of using heuristic, pre-defined trajectories or static placements of gateways has been sub-optimal performance in terms of performance metrics such as network throughput and end-to-end delay. Thus there is a need for a methodology that can achieve improved performance by optimizing network throughput, and minimizing end-to-end delay.

SUMMARY OF THE INVENTION

The present invention relates generally to wireless networks and more particularly to performance optimization in hybrid, non-terrestrial-terrestrial multi-hop mobile wireless networks.

One embodiment of the invention provides a method and apparatus for optimizing performance in a hybrid, non-terrestrial to terrestrial multi-hop mobile wireless network. As used herein, non-terrestrial connotes airborne or space based relative to the earth, a moon, or asteroid, whereas "terrestrial" connotes at or near the surface of the earth, the moon, an asteroid, a planet, or a satellite of a planet, moon or asteroid. More generically, "terrestrial" connotes a location having a gateway where a distributed process is located and monitored and "non-terrestrial" connotes a location remote from the terrestrial location, and which has a capability to connect two or more terrestrial locations or connect a terrestrial location with a central data management or processing point. The method includes providing a first cluster of wireless nodes that include a first plurality of mobile nodes, and a first gateway node. The gateway node interfaces with both the mobile nodes and a Low Earth Orbit satellite (LEO) or Geosynchronous Earth Orbit satellite (GEO). The invention also provides a communicatively isolated second cluster of wireless nodes and a second gateway node that is configured to operate in a manner similar to the first gateway node. The invention establishes a communications link between the first wireless cluster and the second wireless cluster by directing data through a first gateway node, a non-terrestrial and a second gateway node. The invention allows the first gateway node and the second gateway node to dynamically change positions to maximize data throughput, data transmission reliability, and minimize total power consumption, wireless node-level power consumption, gateway level power consumption, periodicity of updates and resulting signaling overhead and complexity of updates and resulting signaling overhead.

In another embodiment of the invention each mobile node in the wireless ad-hoc network includes elements configured to perform a local computation. This computation includes the steps of estimating the mobile nodes' positions and transmitting these positions to the gateway node at time interval T and computing and transmitting the mobile nodes' data load information at time interval t where t<T. The position estimation may be facilitated with the aid of a global positioning system, or a terrestrially based triangulation system, or any other positioning mechanism.

In another embodiment, especially useful in computationally complex environments, the wireless ad-hoc network is divided into a plurality of clusters of smaller wireless ad-hoc networks and additional gateways may be introduced to reduce the computational complexity of the optimization calculations.

BRIEF DESCRIPTION OF THE DRAWINGS

The objects, features, and advantages of the present invention will be apparent from the following detailed description of the preferred embodiment of the invention with references to the following drawings.

DETAILED DESCRIPTION

The present invention provides a method and an apparatus useful for defining positions and trajectories for mobile gateways to serve a set of mobile nodes with some specified trajectories, such that some defined performance metric is optimized, and may be tailored to a variety of other applications. The following description is presented to enable one of ordinary skill in the art to make and use the invention and to incorporate it in the context of particular applications. Various modifications, as well as a variety of uses in different applications, will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

This invention relates to a hybrid wireless network including satellite and terrestrial mobile ad-hoc nodes. The nodes are clustered into mobile groups, and one objective of the present invention is to enable reliable communications between the various node elements, in terrestrially challenging environments. One relatively powerful gateway node, also mobile, is deployed for each cluster of nodes to facilitate communication with a non-terrestrial node. The environment is characterized by the presence of terrain blockages or other severe channel impairments.

The hybrid non-terrestrial-terrestrial multi-hop mobile networks enables robust, wireless networking capability among mobile users who have varying data requirements. Among the fundamental characteristics of this scenario is the mobility of the users, who may be grouped into groups, teams or clusters, and an environment with physical blockages and channel impediments. The aim of the network is to implement a set of new technologies, which can meet the objective of maintaining connectivity under such conditions. The range and flexibility of a land based ad hoc network can be greatly enhanced by the inclusion of LEO or GEO satellite links between the nodes in the network. Non-terrestrial coverage is intended to complement the ad hoc terrestrial network and to provide communications between land mobile nodes in the face of blockages, obstructions, channel degradations, etc. Thus the non-terrestrial node provides an extension network to the ad hoc wireless structure. In this hybrid non-terrestrial-terrestrial multi-hop mobile network, comparatively powerful mobile gateways will be deployed as the primary connectors between the non-terrestrial nodes and the terrestrial mobile nodes.

One embodiment of the present invention provides a mechanism by which a mobile gateway can change its position or define its trajectory based on the position and loading of the nodes in the ad hoc network, so as to optimize certain pre-defined performance criteria, such as power, overhead, throughput. Towards that end, the present invention models a wireless ad-hoc network as a cluster of nodes and each cluster is served by a single gateway. Using information about the loading and the position of each node, it is possible to describe the necessary computational steps required to determine the position of the gateway for optimizing some performance metric. Most of the computations reduce to tractable linear and convex optimization programs. Additionally the present invention includes a design methodology by which the relevant network control features, such as node positions and loading, are exchanged and used to define optimal gateway trajectories in the hybrid satellite and mobile multi-hop ad hoc network.

One of the achievements of this invention is the definition of trajectories for mobile gateways. As such, the gateways may serve a set of mobile nodes with some specified trajectories such that at least one performance metric is optimized. The procedures defined in the invention provide a systematic methodology by which the gateways can be positioned and their trajectories updated. This methodology helps achieve better performance in terms of metrics such as network throughput and end to end delay, as compared with existing static gateway placement schemes, or schemes in which the trajectories of the mobile gateways are defined without taking into consideration system parameters such as positions of individual nodes or the transient loading at each node. The present invention requires a minimal exchange of control information between the gateway and the component ad hoc nodes, and uses a lightweight signaling protocol for accomplishing this task.

The invention can also apply to virtually any hybrid non-terrestrial-terrestrial multi-hop mobile network that is deployed in an environment with blockages and communication impairments. Examples exist in distributed robotic applications, e.g. in terrestrial or extraterrestrial exploration, where mobile nodes have to operate in possibly inhospitable terrain such as outer space, planetary or earth remote locations, for remote sensing, data collection, control applications, etc. The gateways in such applications can serve as the central data collection point for various mobile nodes, and then relayed to appropriate non-terrestrial nodes. Another example may be a troop of soldiers communicating with a gateway in a harsh fading communication environment.

Commercial applications are also anticipated in industrial settings where mobile sensors or systems are needed to monitor or control a distributed process (e.g. physical packages being automatically routed and delivered, raw materials being handled remotely in the process line-up of a manufacturing plant etc.) or for security applications, and situations where the information from mobile robotic sensors are aggregated at a single concentrator node or gateway.

Figure 1:
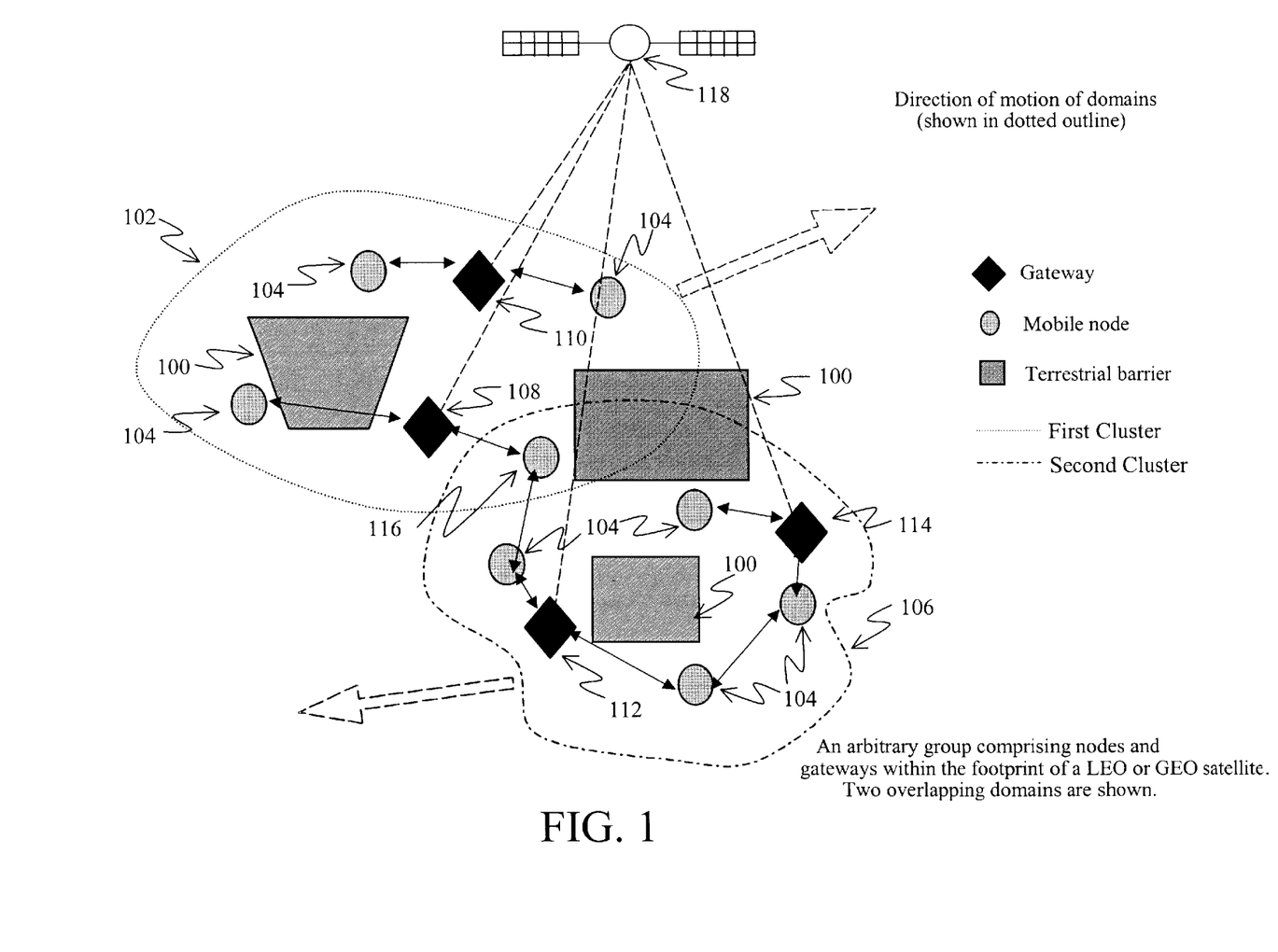
FIG. 1 shows an ad-hoc network of arbitrary domains of mobile nodes and gateways.

The scenario under consideration can be visualized as shown in FIG. 1, where obstacles 100 such as terrain, inhibit signal propagation. For example, consider two groups of mobile nodes and gateways. The first cluster 102 may have some directed trajectory and the nodes 104 within the first cluster 102 may have some actual motion within the first cluster and the second cluster or group 106 can be considered to be arbitrary. Separate groups of mobile nodes and gateways may overlap during motion, and nodes may enter or exit from one group to another. In FIG. 1 a first gateway 108 and a second gateway 110 are associated with the first cluster 102 while a third gateway 112, and a fourth gateway 114 are associated with the second group. The node 116 in the common area may be associated with either the first cluster 102 or the second cluster or group 106. Additionally, there are regions present in the terrain where neither a node nor an associated gateway can reside (e.g. hazard zones, physical impediments, etc.). In such an environment, where the position of both the nodes and gateways 108, 110, 112, 114 are not static, a question arises as to where the gateways should be positioned for optimal node-to-satellite 118 communications, and how the motion and data loading of the nodes would affect the positions of the gateways over time. In other words, the general problem can be formulated in the following manner:

For an arbitrary collection of groups of wireless nodes 104 and gateways, all of which are mobile within the footprint of a satellite 118, and each of which has certain range restrictions, the goal is to determine the placement and trajectories of mobile gateways so as to optimize some defined performance metric.

The general problem to be solved with the present invention is a multi-dimensional optimization problem that may or may not be tractable. The performance metrics can include, without limitation the total power expended (or maximum power consumption per node or gateway); the data throughput; data transmission reliability especially with regards to delivering QoS such as bandwidth utilization, bit error rate, message delay, etc.; periodicity (and complexity) of updates and resulting signaling overhead.

Rather than formulate a solution to a problem that captures the effects of all the various parameters, but which may be complex and in the extreme case may not provide an optimal position, the present approach has been to decompose the general problem into a set of simpler optimization problems. Thus, the position of the gateway node may be defined by taking fewer parameters into account, thus effectively trading performance robustness for computational simplicity.

The methodology for determining gateway position and trajectory can be summarized by means of two flowcharts. The first flowchart, shown in FIG. 2, outlines the local computations that each wireless node in the ad hoc network performs, per sampling period, to facilitate the computation of the optimal gateway trajectory. According to FIG. 2 a node estimates its position 200, this estimation may be accomplished with the aid of a global positioning system, terrestrial based triangulation protocol, or other appropriate positioning system. In the next step 202, the wireless node sets or resets, as appropriate, a counter for a time interval T. The time interval T may be user defined, predefined or specified by a component, and based on an ascertained situational awareness. In the third step 204, the node queries if the interval, T, has been met or exceeded. If it has, the protocol returns to the first step 200. If the interval, T, has not been met or exceeded, the next step 206, queries if a shorter interval, t, has elapsed. If not wait 208 for an interval and then query 206 if the shorter interval, t, has elapsed. If it has elapsed then go to the next step, 210 and compute and transmit data load information for past interval T. Next, return to 204, if the interval T has elapsed then go to element 200, otherwise go to element 206. It should be noted that the time interval over which the wireless node estimates its average load, and t is the information sampling interval, or the time instant at which the node transmits its position and data load information to the gateway node.

Figure 3:
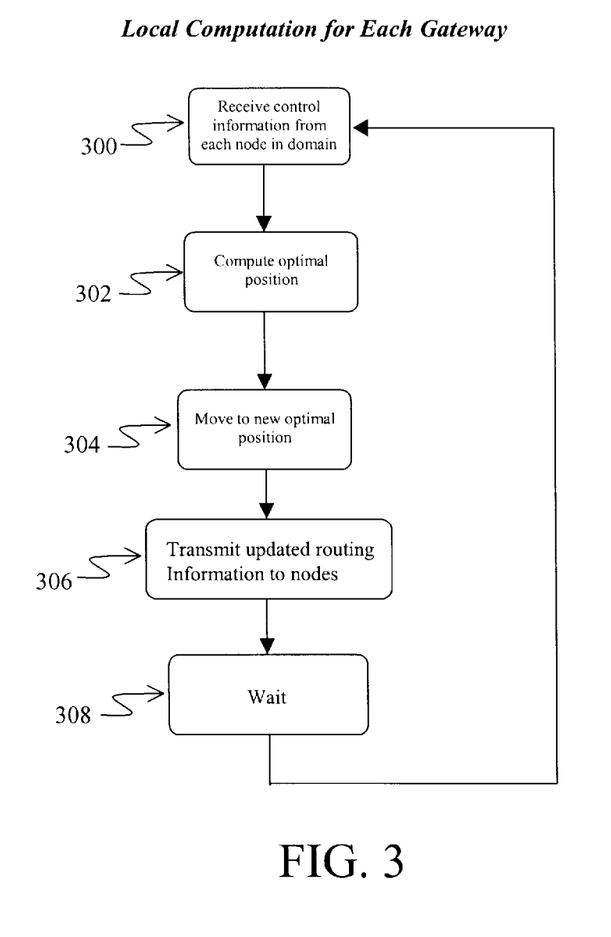
FIG. 3 shows the local computation at each gateway.

The second flowchart, shown in FIG. 3 outlines the local computations that each gateway node performs, per sampling period, to facilitate the computation of the optimal gateway trajectory. The local computation for each gateway includes the following steps; first 300 the gateway node receives control information from each node in its domain or cluster. The control information includes the wireless nodes' data load and position. The second step 302 provides for the computation of the optimal position for the gateway node. The third step 304, provides for the movement of the gateway node to a new optimal position.

The fourth step 306 provides for the transmission of updates of routing information to wireless nodes. The final step 308 for the waiting for a period equal to interval T. After the wait 308 the cycle is repeated by returning to the first step 300.

Figure 4:
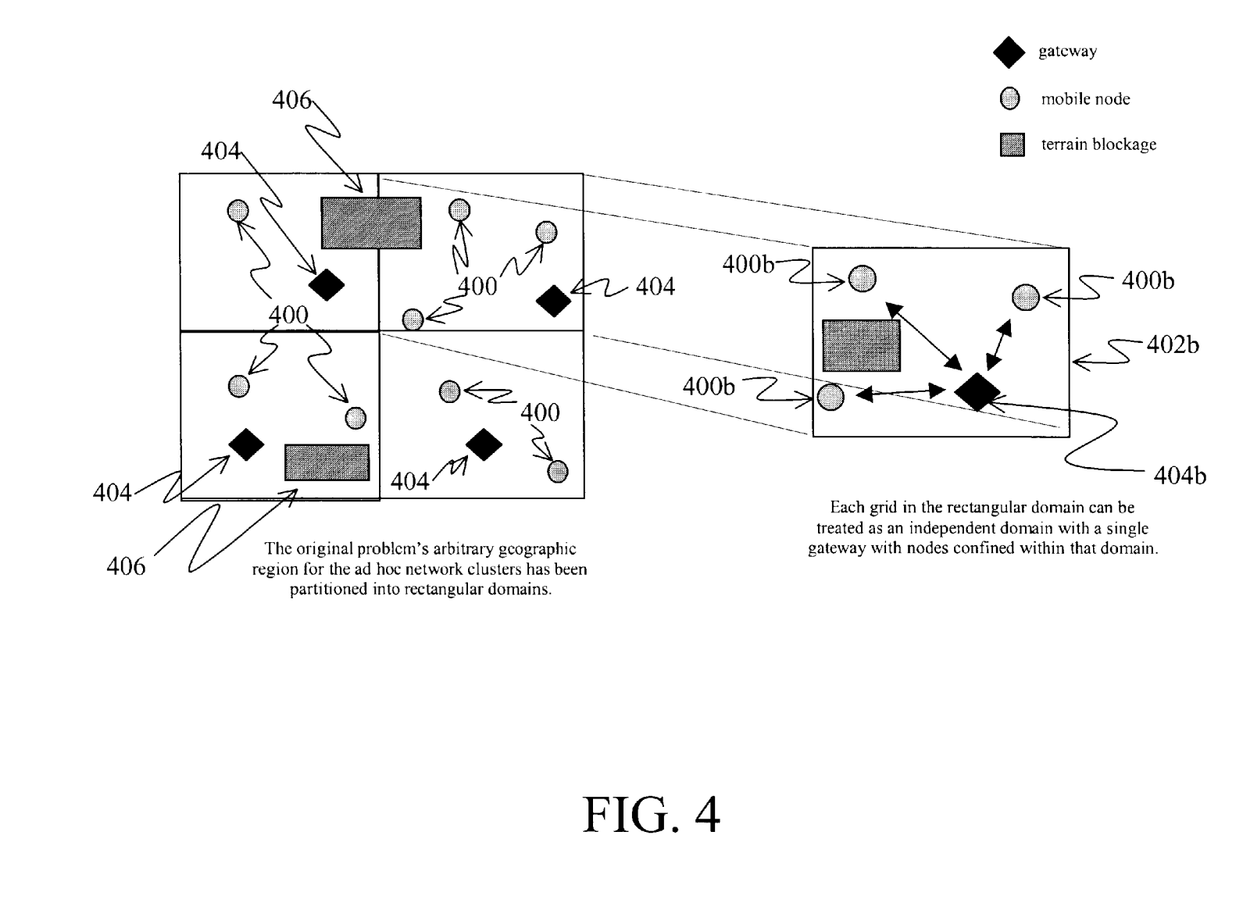
FIG. 4 depicts how the original network can be decomposed into smaller clusters

The decomposition of the original problem into the single domain case is presented in FIG. 4. FIG. 4. depicts what might be an actual scenario where the present invention might find application. The mobile nodes 400 are randomly sprinkled throughout a geographic area 402, amid the mobile nodes are a plurality of gateway nodes 404, and further, among both types of nodes there are terrestrial impediments 406. The FIG. 4. shows a typical geoscape, where geoscape is understood to refer to nodal distribution over a geographic region. The geoscape has been partitioned into four rectangular domains. The geoscape is decomposed and one geoscape 402b is shown in FIG 4. Each grid in the rectangular domain can be treated as an independent domain 402b with a single gateway node 404b and with the mobile nodes 400b confined within that domain 402b. FIG. 4 shows one gateway per sub-domain and nodes 'trapped' within each domain. Thus, by symmetry, it is sufficient to solve the placement problem for only one of the rectangular domains.

In some situations the gateway node may be placed based on mobile node position information only. The objective in this situation is to formulate the general problem as a sequence of simpler optimization problems, increasing in complexity, which capture some essential dynamics of the original problem and can be solved by simple optimization techniques. The first simplifications made to the general model are as follows:

A Low Earth Orbit (LEO) satellite has a uniform rectangular footprint over the terrain of interest. This geometric symmetry simplifies the position vector expressions, but the approach is applicable to any generic footprint. Each rectangular footprint area can be subdivided into identical rectangular domains, each containing one gateway and an arbitrary number of nodes.

The invention constrains nodes within each domain to not leave that domain, but rather bounce back into the domain upon hitting the domain boundary.

Figure 2:
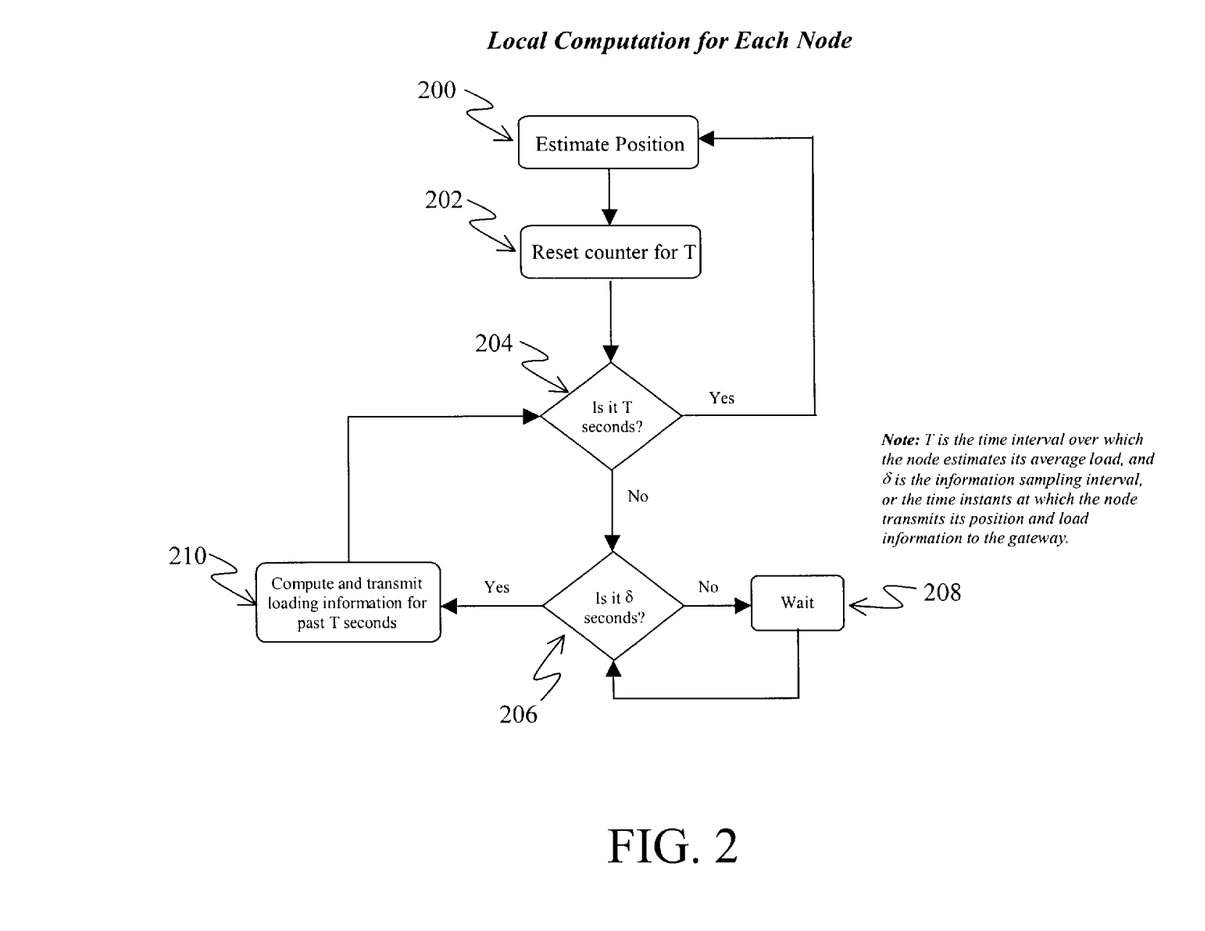
FIG. 2 details the local computation at each node.

Using the above assumptions, the original problem is decomposed to the optimal gateway placement problem for a single domain, this is represented in FIG. 2. Additional assumptions may now be made to formulate the single domain problem:

(i) Position information (and possibly terrain information) via GPS is available to all the nodes within the domain.
(ii) The data traffic load generated at each node is equal.
(iii) The gateway can query each node for its position and load.
(iv) Each node has a direct link to the gateway serving that domain.

It should be noted that wireless channel characteristics, such as fading, multipath distortion, etc. are not considered in this first instance.

Using the above assumptions, the problem simplifies to the calculation of the geometric centroid of the node positions, constrained only by the boundaries of the domain and the blockages. Thus for n nodes and one gateway, this optimization problem can be formulated as follows:

$$\min \sum_{i=1}^{n} \|\vec{x}_i - \vec{x}_0\| \text{ where } \vec{x}_i \text{ are position vectors } (\vec{x}_0 \text{ is gateway location})$$ Eqn. 1

$$\text{s.t.} \begin{cases} \vec{w}_1 \le \vec{x}_0 \le \vec{w}_2 & \text{boundary constraint on gateway} \\ \vec{b}_{1k} \le \vec{x}_0 \le \vec{b}_{2k}, & \text{blockage constraint (for each blockage object } k) \end{cases}$$

The optimization variable in the above expression is the gateway position (represented by position vector, $x_0$), and other $x_i$'s represent the coordinate vectors of the mobile nodes at the sampling instant. $w_i$'s are the vector coordinates representing the 2 dimensional boundary of the domain (length, width), and $b_{ik}$'s are the boundaries of the $k^{th}$ blockage (which itself is assumed to be a rectangular region within the domain). So, in essence, the invention is minimizing the sum of the distances from the gateway to the nodes subject to the boundary and blockage constraints.

As stated, this problem is a non-linear optimization problem, but since the cost function is the $L_2$ norm and the constraints are linear, the problem is a convex optimization problem (all norm functions are convex). Thus this problem has a global optimum and any of the standard convex optimization algorithms can be used to find the optimal position for the gateway. Examples of standard convex optimization algorithms include steepest descent, Newton's methods, etc. For additional information the reader is referred to Dimitris Bertsimas, John Tsitsiklis, *Introduction to Linear Optimization*, 1997, Athena Scientific, Belmont, Mass., which is herein incorporated by reference.

The gateway node, using the information about the position vector of each node and the boundaries of the terrestrial barriers, will make a local computation of its optimal position and move to that location.

However, another transformation can be affected and this transformation can render the above convex optimization problem into a simple linear program (LP) which can then be solved more efficiently via modern interior point algorithms. Additional information on interior point algorithms may be found Dimitri Bertsekas, *Nonlinear Programming*, 1995, Athena Scientific, Belmont, Mass., which is herein incorporated by reference. This transformation involves introducing a dummy variable, z, which takes the place of the cost function, and bounds the distance norm. The norm is then decomposed and incorporated into the constraint part of the problem as a set of linear inequalities.

Thus, if the scalar variable $z_i$ is defined as:

$$\left\| \vec{x}_i - \vec{x}_0 \right\| \leq z_i$$

for each i, then minimizing the distance is equivalent to minimizing the sum of the variables $z_i$, subject to the above defining constraint on each $z_i$. This decomposes the norm minimization problem to a simple linear program, and the LP form of optimization problem is:

$$\min \sum_{i=1}^{n} z_i$$

$$\text{s.t.} \begin{cases} -z_i \leq \vec{x}_i - \vec{x}_0 \leq z_i, & i = 1, K\ n \quad \text{linearization variables, } z_i \\ \vec{w}_1 \leq \vec{x}_0 \leq \vec{w}_2, & \text{boundary constraint} \\ \vec{b}_{1k} \leq \vec{x}_0 \leq \vec{b}_{2k}, & \text{blockage constraint (for each blockage object } k) \end{cases}$$

Optimization variables are $z_i$ and $x_0$, and the optimization computation may be done at the gateway.

The invention provides for placement based on node position and effects of loading. Having done the preliminary calculations, it is now possible to begin to introduce more realistic effects into the above model by relaxing some of the simplifying assumptions made earlier. The next layer of complexity involves including the loading parameters in the optimization problem formulation. Thus if each of the nodes i presents a load $\rho_i$ to the network, it is possible to simply form a weighted sum and use it as the cost function of the optimization problem:

$$\min \sum_{i=1}^{n} \rho_i \left\| \vec{x}_i - \vec{x}_0 \right\| \quad \text{where } \rho_i \text{ represents loading at node } i \quad \text{Eqn 3}$$

$$\text{s.t.} \begin{cases} \vec{w}_1 \leq \vec{x}_0 \leq \vec{w}_2 \\ \vec{b}_{1k} \leq \vec{x}_0 \leq \vec{b}_{2k} \end{cases}$$

This optimization problem is still convex and can be simplified to yield the following equivalent LP problem:

$$\min \sum_{i=1}^{n} \rho_i z_i \quad \text{where } \vec{\rho} \text{ is the load vector} \quad \text{Eqn 4}$$

$$\text{s.t.} \begin{cases} -z_i \leq \vec{x}_i - \vec{x}_0 \leq z_i, & i = 1, K\ n \\ \vec{w}_1 \leq \vec{x}_0 \leq \vec{w}_2 \\ \vec{b}_{1k} \leq \vec{x}_0 \leq \vec{b}_{2k} \end{cases}$$

The optimization variables are, once again, $z_i$ and $x_0$. $\rho_i$ may be computed by observing the queue state at node i over some pre-specified sampling duration. This is described later in the document. Once the gateway has the values of the loading, pi, in addition to the position of each node, it performs a local computation to find the optimal position and upadates its trajectory accordingly.

So far, the effects of the channel have not been considered explicitly (although the minimization of the average distance would intuitively lower the total propagation losses for the system). To make this relationship explicit, a first order approximation can be made by considering the total power expended in the system from transmission tasks as the invention's performance metric. Thus, normalizing all factors, if a node has a load of pi, and transmits with an effective power of $\lambda_i$, and assuming a path loss exponent of 4 (typical for wireless propagation path loss), then to maintain, at each node, a required SNR, $\gamma_i$, while minimizing the total power used, the following optimization formulation is returned:

Eqn. 2

$$\min \sum_{i=1}^{n} \rho_i \lambda_i \quad \text{where } \lambda_i \text{ is the effective power used by node } i \quad \text{Eqn 5}$$

$$\text{s.t.} \begin{cases} \dfrac{\lambda_i}{\left\| \vec{x}_i - \vec{x}_0 \right\|^4} \geq \gamma_i & \text{The SNR condition} \\ \vec{w}_1 \leq \vec{x}_0 \leq \vec{w}_2 \\ \vec{b}_{1k} \leq \vec{x}_0 \leq \vec{b}_{2k} \end{cases}$$

The optimization variables are the power at each node i, i.e. $\lambda_i$, and the geographical co-ordinates of the gateway location, $x_0$. In addition to position and loading information, the gateway, in this case, also needs to maintain a list of acceptable SNR levels, $\gamma_i$. It also has to communicate the effective power levels, $\lambda_i$, to each node. Eqn. 5 still represents a form of gateway position optimization, but the cost function reflects power as the performance metric being optimized. Fortunately, Eqn. 5 is a form of a geometric program (GP) which can also be solved for the global optimum.

Gateway placement may be optimized by considering only directly connected nodes. Thus far, the optimal position of the gateway has been determined with respect to the direct geographical distance between the position of the gateway and each node in the domain. Realistically, nodes access the gateway via multiple hops. This may affect the optimal gateway, since the gateway can then effectively exclude indirect nodes in the calculation of the optimal position. This scenario introduces several issues. For example, a node may be lightly loaded, in which case, it may be more power efficient to force that node to relay its data through other nodes and let the gateway ignore that node in its optimization calculation. This decision to force a node to hop through its neighbor can be directed by the gateway by a centralized protocol, or by a distributed protocol (which would result in more overhead) wherein the node itself may query its neighbors and decide to use a relay rather than contact the gateway directly. Note that in that case, the node which is used as the relay will now have to carry the load of the source node to which it acts as a relay in addition to its own load.

Figure 5:
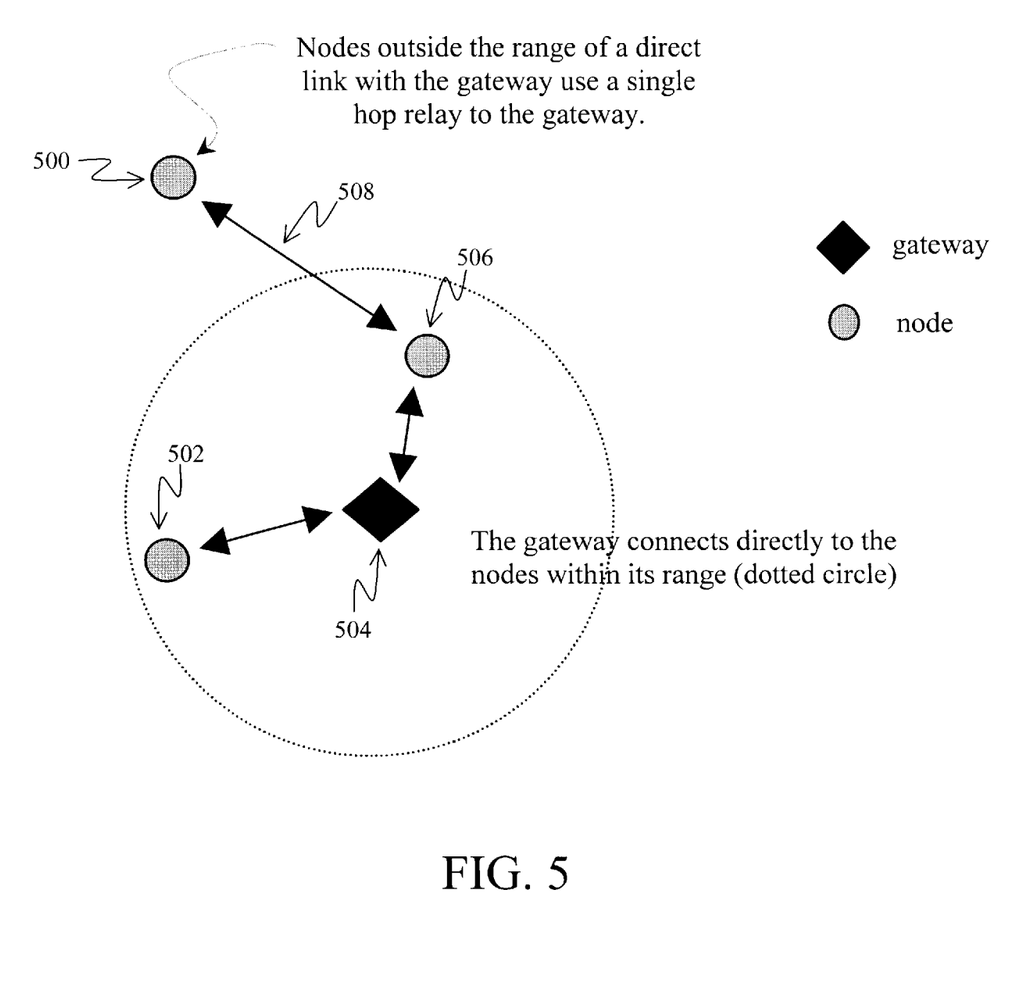
FIG. 5 shows the results of a gateway placement optimization with three mobile nodes and a 'single hop' option.

To formulate an expression for the modified optimization problem which incorporates the case of nodes allowed to use a single relay, consider the following three-node case. The gateway placement optimization with three nodes and the 'single hop' option is depicted in FIG. 5. Here, each node is restricted to either directly contact the gateway or to use at most one intermediate relay.

Without the multi-hop capability, the optimization would take into account the relative loading, but would still do a weighted centroid calculation. However, the invention now needs to factor in the path losses for each of the links between node 1 500 to node 2 502, node 1 500 to the gateway node 504, node 1 500 to node 3 506 etc. The invention is configured to choose the gateway node 504 location such that a total of three links exist in the optimum case, since for three nodes only three links are required to connect to the gateway, either directly or using an intermediate relay. The nodes outside the range of a direct link with the gateway node 504 use a single hop relay 508 to the gateway node 504. This is a graph theoretic result, which can be phrased as the following lemma:

Lemma: For a network with a gateway at the root of a strongly connected graph forming a tree, and n distributed nodes, exactly n links are required to establish a path from every node to the gateway.

Proof: The proof is by induction. Define statement $P_n$:=the lemma is true for n nodes. Then $P_1$—the case of one node and one gateway—is true trivially, see FIG. 6.

Figure 6A:
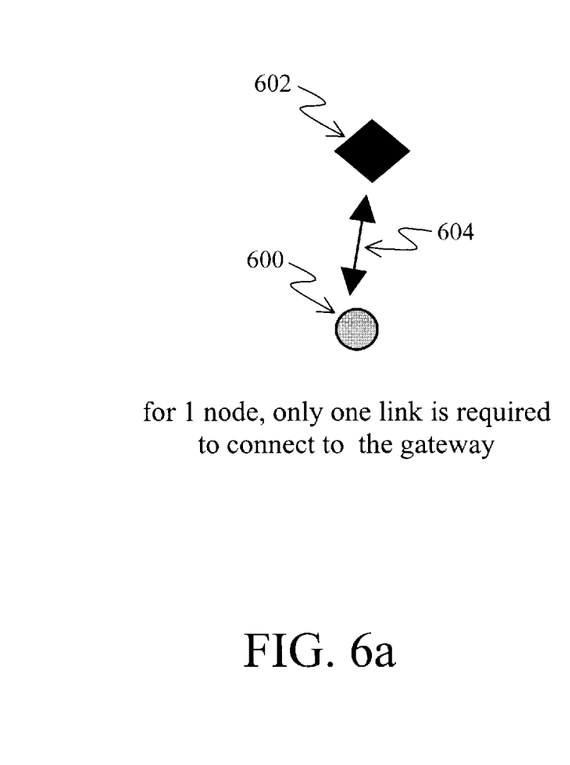
FIG. 6 details why n nodes require exactly n links for a path to a gateway.
Figure 6B:
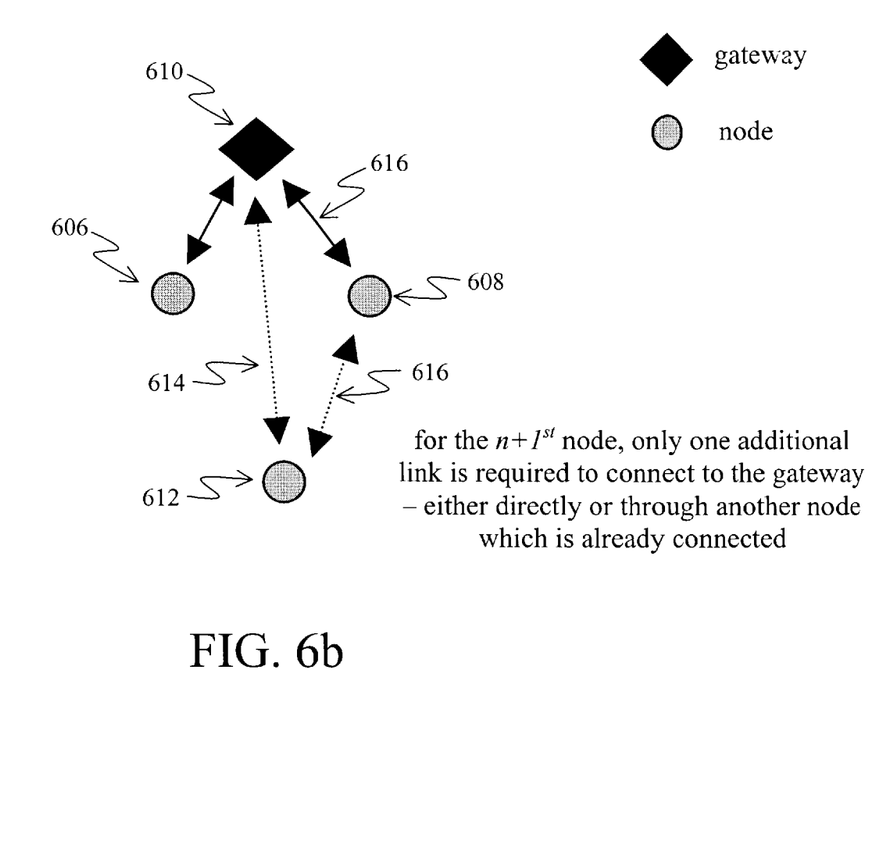

The depiction set forth in FIG. 6 shows that n nodes require exactly n links for a path to the gateway. In FIG. 6a, a single mobile node 600 and a single gateway node 602 are shown. In this, most trivial situation, n is equal to 1 and there is only one link 604 required to connect to the gateway. In FIG. 6b, there is a first node 606 and a second node 608 in direct contact with the gateway node 610. A third node 612, is also in contact with the gateway node 610, but indirectly so. The third node 612 is the $n+1^{st}$ node. For the $n+1^{st}$ node 612 only one additional link is required to connect to the gateway node 610—either directly 614 or via links 616 through another node 608 which is already connected to the gateway node 610.

Assume $P_n$ is true (i.e for n nodes exactly n links are required to ensure a path from every node to the gateway). Then the $(n+1)^{st}$ node can either establish a link with the gateway directly, or connect to one of the remaining n nodes, which in turn already has a path back to the gateway. In either case, the $(n+1)^{st}$ node needs only one additional link to connect to the gateway and hence, the total number of links required for the (n+1) nodes to connect to the gateway is exactly (n+1).

Thus $P_n => P_{n+1}$, and since $P_1$ is true, $P_n$ is true for all n. Q.E.D.

In addition to choosing exactly 3 links for the 3 node example described above, the links chosen have to be such that minimum energy is expended to establish connectivity in the network. Furthermore, the links chosen cannot be between just the nodes themselves, leaving out the gateway altogether. The increase in loading in the relay node also needs to be taken into account. To formulate this problem with all these constraints, the invention uses indicator variables, $\beta$, which indicate by being either 0 or 1 which of the various possible links are active. The result is the following optimization problem:

$$\min \begin{cases} \beta_{10} A_{10} \rho_1 \|\overset{\rho}{x_1} - \overset{\rho}{x_0}\| + \beta_{20} A_{20} \rho_2 \|\overset{\rho}{x_2} - \overset{\rho}{x_0}\| + \beta_{30} A_{30} \rho_3 \|\overset{\rho}{x_3} - \overset{\rho}{x_0}\| + \Lambda \\ \beta_{12} A_{12} (\rho_1 + \rho_2) \|\overset{\rho}{x_1} - \overset{\rho}{x_2}\| + \beta_{13} A_{13} (\rho_1 + \rho_3) \|\overset{\rho}{x_1} - \overset{\rho}{x_3}\| + \beta_{23} A_{23} (\rho_2 + \rho_3) \|\overset{\rho}{x_2} - \overset{\rho}{x_3}\| \end{cases} \quad \text{Eqn. 6}$$

$$\text{s.t.} \begin{cases} \beta_{10} + \beta_{20} + \beta_{30} + \beta_{12} + \beta_{13} + \beta_{23} = 3 & \text{only three total links allowed} \\ \beta_{12} + \beta_{13} + \beta_{23} \le 2 & \text{gateway must be included} \\ \beta_{mn} \in \{0, 1\} & \text{integer constraint} \\ \overset{\rho}{w_1} \le \overset{\rho}{x_0} \le \overset{\rho}{w_2} \\ \overset{\rho}{b_{1k}} \le \overset{\rho}{x_0} \le \overset{\rho}{b_{2k}} \end{cases}$$

The A's are the corresponding path losses, and the remainder of the terms in the cost function are the effective loads and distance factors. The first condition in the constraint equations list ensures that only three links may join the three nodes to the gateway, directly or through a single relay. The second constraint forces at least one of links to be from one of the nodes to the gateway. The third condition is the indicator variable integer requirement. The other constraints are as before. The gateway, in this case, needs to know the path loss factors, in addition to the node position, loading, and blockage positions in order to complete the computation locally and determine its optimal trajectory.

Unfortunately, the third integer constraint condition transforms this problem for the three node case into a non-linear, non-convex, integer programming (IP) problem. However, a sub-optimal solution can be obtained by approximating a solution by an LP relaxation of the above IP. Similar to the methodology described above, expressions for gateway placement optimization with respect to other performance measures can be developed. From an analytic point of view, the number of nodes in any domain is of no consequence in the optimization calculations (except for the computation time and problem size) since the computation is performed by the gateway at sample instants of time. Each additional update is preceded by a query by the gateway to compute the current state of the network.

In another embodiment of the present invention a Medium Access Control (MAC) protocol and routing support sequence is used for optimal gateway node placement. From a routing perspective, a hybrid satellite and mobile ad hoc network falls in between the classes of infrastructured networks (fixed base-station and mobile nodes) and infrastructureless mobile ad hoc networks. At a preliminary level, the gateways in the hybrid satellite-mobile network can be thought of base-stations, but in contrast to traditional base-stations, the gateways according to the invention's paradigm are mobile, and nodes within the domain of the gateways are allowed to use intermediate relay nodes.

On the other hand, unlike true ad hoc networks, a routing table from every node to every other node, e.g. for nodes between two different gateways' domain, are not required.

To accomplish efficient routing in the invention's particular hybrid scheme in support of the optimal gateway placement methodology proposed in the previous section, most of the table driven protocols for wireless ad hoc networks can be used. For additional reading see Elizabeth Royer, C-K Toh, "A Review of Current Routing Protocols for Ad Hoc Wireless Networks", *IEEE Personal Communications Magazine*, April 1999, pp. 46–55, which is incorporated herein by reference. For example, a modified form of the Gateway Switch Routing (CGSR) protocol is suitable.

The Medium Access Control (MAC) protocol for the invention's specific hybrid network inherently cannot involve a static channel allocation, because of the bursty nature of the nodes' data and their random mobility. Consequently, the invention needs a reliable MAC access to exchange control and payload information between the nodes and the gateway. For example, the relatively simple slotted ALOHA protocal, using RTS/CTS with acknowledgement is suitable.

The load estimation can be carried out by each node itself by taking a fixed time interval, T, and counting the number of data frames generated within that interval, N(T). Then the offered load is simply the ratio N(T)/T. This computation has to be updated at a regular interval, and the rate of these updates will be application specific.

In the methodology set forth thus far, the invention has only considered the case of nodes clustered in a single domain served by a single gateway. The procedure for determining the optimal position and trajectory of the gateway under these circumstances has been described. The invention can now extend this procedure to the case involving multiple domains and gateways, as depicted in FIG. 7 that shows a mobile node 700 within overlapping gateway domains.

Figure 7:
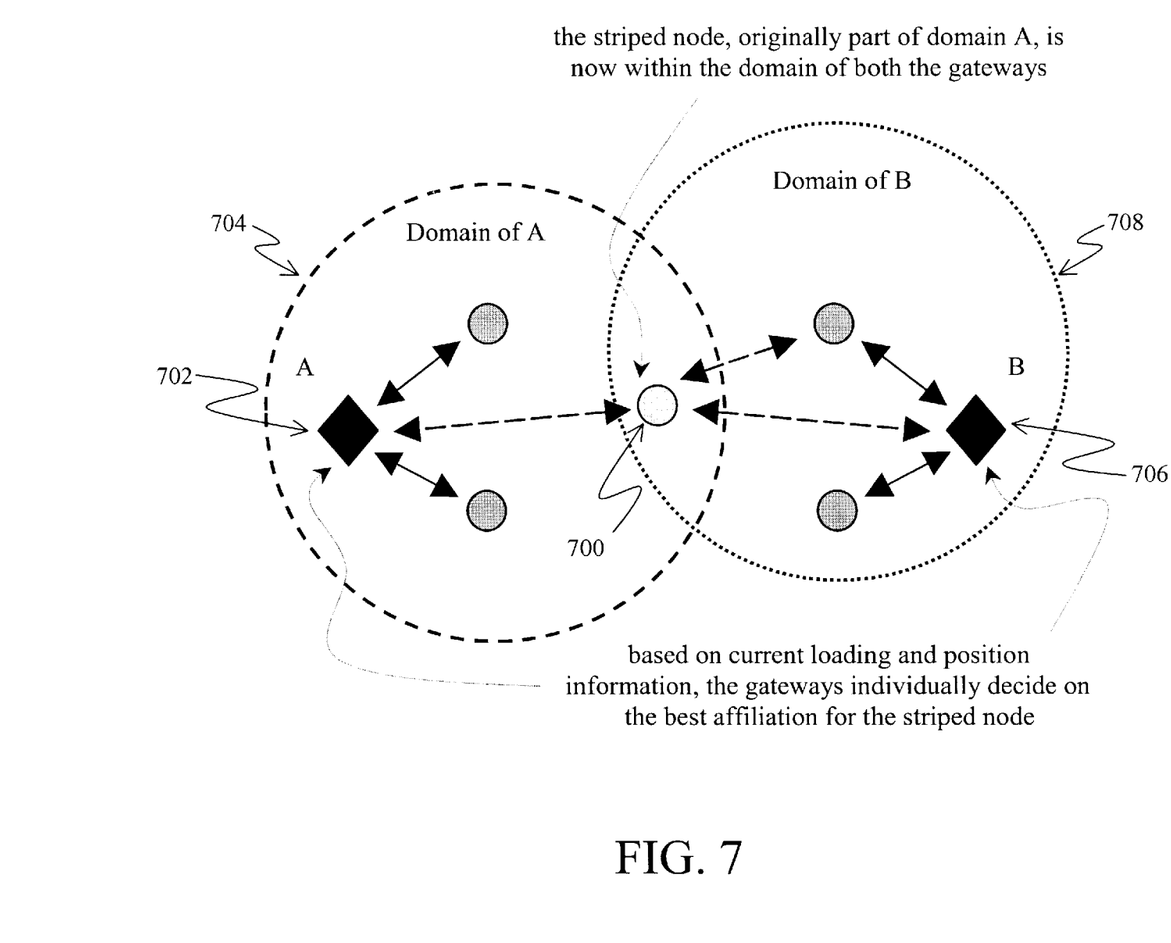
FIG. 7 shows a node within two overlapping gateway domains.

Thus in FIG. 7 above, a first gateway node 702 originally has a first specific domain space indicated by the first dotted circle 704 and a second gateway node 706 originally has a second specific domain space indicated by a second dotted circle 708. These circles refer to the domains of the first gateway node 702 and the second gateway node 706. Within each domain there are a cluster of nodes. Although the specific motion of the individual nodes themselves may be essentially random, they are, however, initially affiliated with a particular gateway and remain restricted within the boundary of that gateway's domain. Thus their overall general direction of motion is governed by the group motion of the cluster of nodes in the domain served by that gateway. The mobility pattern itself is also affected by a number of factors. These include, but are not limited to, channel conditions such as multipath distortions, fading, interference, terrain blockages, direction of motion and velocity of a phenomenon which is being tracked, etc.

During the course of the group motion of different clusters, when two or more such independent domains overlap, then one or several nodes may fall within the domains of multiple gateways, for example, the common node 700, which can be assumed to have been originally affiliated with the first gateway node 702, is now also in the domain of the second gateway node 706. In this case, the optimal position and trajectory of each of the gateways can be determined as follows.

The common node 700 transmits its usual position and loading information to the first gateway node 702, with which it is already affiliated in addition to the second gateway node 706. Depending on the first gateway node's 702 current position and loading state, four cases are possible:

First: The first gateway node 702 may completely ignore the common node 700. Completely ignoring includes ignoring both the common nodes 700 data packets and position information in the calculation of the first gateway node's 702 optimum trajectory;

Second: The first gateway node 702 may elect to accept data packets from the common node 700 as long as that node remains within its domain, but the first gateway node 702 may choose to ignore the position of that node in the calculation of its optimum trajectory;

The first gateway node 702 may consider the common node 700 as being temporarily affiliated with the first gateway node 702 and the cluster it is serving inside its domain, and thus accept its data packets as well as completely consider its position in the calculation of the optimum gateway position and trajectory;

Third: The striped common node 700 may become partially affiliated with both the first gateway node 702, and the second gateway node 706 and each of the gateways may choose to accept a portion of the data packets being sent by the stripped node 700.

In any case, a suitable underlying MAC and routing protocol is used so that the common node 700 remains aware that it is within the domain space of more than one gateway. The stripped node 700, in turn, floods its own routing zone with its position and loading information, with the signaling overhead that is allowed being based on some specified maximum hop count (implemented, for example, via the Time to Live, TTL, field in the node data frame). However, in all the cases outlined above, the gateways nodes, once again, only need to make a local computation to decide at each sampling time as to the appropriate course of action.

What is claimed is:

1. A method for optimizing performance in a hybrid mobile wireless ad-hoc network comprising acts of:

providing a first wireless cluster comprising the following elements:
  i. a first plurality of mobile nodes, and
  ii. a first gateway node,
where the first plurality of mobile nodes are communicatively linked to the first gateway node:
providing a second wireless cluster including the following elements:
  i. a second plurality of mobile nodes, and
  ii. a second gateway node,
where the second plurality of mobile nodes are communicatively linked to the second gateway node:
establishing a communications link between the first wireless cluster and the second wireless cluster by directing data sequentially through:
  i. the first gateway node;
  ii. a satellite; and
  iii. the second gateway node,
wherein the first gateway node's and the second gateway node's positions are dynamically selected to optimize at least one of the following:
  i. data throughput;
  ii. data transmission reliability including at least one of the following:
    a) maximizing bandwidth utilization;
    b) minimizing bit error rate; and
    c) minimizing message delay;

iii. total power consumption;
iv. wireless node-level power consumption;
v. gateway level power consumption;
vi. periodicity of updates and resulting signaling overhead; and
vii. complexity of updates and resulting signaling overhead.

2. The method as set forth in claim 1, wherein each mobile node in the wireless ad-hoc network performs a local computation comprising acts of:
   i. estimating its position and transmitting its position to the gateway node at every time interval T; and
   ii. computing and transmitting its data load information at time interval t, where t<T.

3. The method as set forth in claim 2, wherein the satellite is selected from a list comprising at least one of the following:
   i. a low earth orbit satellite; and
   ii. a geosynchronous earth orbit satellite.

4. The method as set forth in claim 1, wherein at least one gateway node comprises a separate processor which is solely dedicated to the optimization calculations.

5. The method as set forth in claim 1, wherein at least one gateway node is mobile.

6. A method for optimizing performance in a hybrid mobile wireless ad-hoc network comprising acts of:
   providing a first wireless cluster comprising the following elements:
      i. a first plurality of mobile nodes, and
      ii. a first gateway node,
   where the first plurality of mobile nodes are communicatively linked to the first gateway node:
      providing a second wireless cluster including the following elements:
         i. a second plurality of mobile nodes, and
         ii. a second gateway node,
   where the second plurality of mobile nodes are communicatively linked to the second gateway node;
      establishing a communications link between the first wireless cluster and the second wireless cluster by directing data sequentially through:
         i. the first gateway node;
         ii. a satellite; and
         iii. the second gateway node,
      where the first and second gateway nodes perform the following computational acts during a time interval:
         i. receive control information from each mobile node in the cluster;
         ii. compute optimal gateway node position;
         iii. assign gateway node to new optimal position; and
         iv. transmit updated routing information.

7. The method as set forth in claim 6, wherein the gateway node ignores at least one node for the purposes of an optimization calculation, based on at least one of the following criterion:
   i. degree of node load;
   ii. node remoteness; and
   iii. unacceptable complexity in the optimization calculation; and
directs said at least one node to communicate through a neighboring node.

8. The method as set forth in claim 7, wherein a decision to force said at least one node to form a link via its neighbor can be ordered by at least one of the following:
   i. the gateway node with a centralized protocol;
   ii. a distributed protocol wherein said at least one node itself may query its neighbors and elect to use a relay node rather than to contact the gateway directly.

9. A method for optimizing performance in a hybrid mobile wireless ad-hoc network comprising acts of:
   providing a first wireless cluster comprising the following elements:
      i. a first plurality of mobile nodes, and
      ii. a first gateway node,
   where the first plurality of mobile nodes are communicatively linked to the first gateway node;
      providing a second wireless cluster including the following elements:
         i. a second plurality of mobile nodes, and
         ii. a second gateway node,
   where the second plurality of mobile nodes are communicatively linked to the second gateway node;
      establishing a communications link between the first wireless cluster and the second wireless cluster by directing data sequentially through:
         i. the first gateway node;
         ii. a satellite; and
         iii. the second gateway node,
   wherein the wireless ad-hoc network is sub-divided into a cluster of smaller wireless ad-hoc networks and additional gateways are introduced to reduce the computational complexity of the optimization calculation.

10. An apparatus for increasing performance in a hybrid, non-terrestrial to terrestrial multi-hop mobile wireless network comprising:
    a first wireless cluster including the following elements:
       i. a first plurality of mobile nodes; and
       ii. a first gateway node;
    where the first plurality of mobile nodes are communicatively linked to the first gateway node;
       a second wireless cluster including the following elements:
          i. a second plurality of mobile nodes: and
          ii. a second gateway node;
    where the second plurality of mobile nodes are communicatively linked to the second gateway node;
       a communications link between the nodes in the first wireless cluster and the nodes in the second wireless cluster that sequentially directs data through:
          i. the first gateway node;
          ii. a satellite; and
          iii. the second gateway node,
       wherein the first gateway node and the second gateway node comprise elements that are configured to receive data from at least one mobile node in the relevant gateway node's cluster and based on this data to dynamically select the gateways position relative to the mobile nodes to optimize one or more of the following:
          i. data throughput;
          ii. data transmission reliability including at least one of the following:
             a) maximizing bandwidth utilization;
             b) minimizing bit error rate; and
             c) minimizing message delay;
          iii. total power consumption;
          iv. wireless node-level power consumption;
          v. gateway level power consumption;
          vi. periodicity of updates and resulting signaling overhead; and
          vii. complexity of updates and resulting signaling overhead.

11. The apparatus as set forth in claim 10, wherein each mobile node in the wireless ad-hoc network comprises elements configured to perform a local computation comprising acts of:

i. estimating the mobile nodes' positions and transmitting these position to the gateway node at time interval T; and ii. computing and transmitting the mobile nodes' data load information at time interval t where t<T.

12. The apparatus as set forth in claim 10, wherein the mobile nodes positions are estimated with the aid of at least one of the following:

i. a global positioning system;

ii. a terrestrially based triangulation system; and iii. a generic positioning system.

13. The apparatus as set forth in claim 10, wherein the non-terrestrial relay is selected from a list comprising at least one of the following:

i. a low earth orbit satellite;

ii. a geosynchronous earth orbit satellite.

14. The apparatus as set forth in claim 10, wherein the gateway nodes comprise separate processors which are solely dedicated to the optimization calculations.

15. The Apparatus as set forth in claim 10, wherein at least one gateway node is mobile.

16. An apparatus for increasing performance in a hybrid, non-terrestrial to terrestrial multi-hop mobile wireless network comprising:

a first wireless cluster including the following elements:

i. a first plurality of mobile nodes; and ii. a first gateway node;

where the first plurality of mobile nodes are communicatively linked to the first gateway node;

a second wireless cluster including the following elements:

i. a second plurality of mobile nodes; and ii. a second gateway node;

where the second plurality of mobile nodes are communicatively linked to the second gateway node;

a communications link between the nodes in the first wireless cluster and the nodes in the second wireless cluster that sequentially directs data through:

i. the first gateway node;

ii. a satellite; and iii. the second gateway node, where the gateway nodes comprise an element configured to perform the following computations during a time interval:

i. receive control information from each node in each cluster;

ii. compute the optimal position;

iii. assign the gateway node to a new optimal position; and iv. transmit updated routing information.

17. The apparatus as set forth in claim 16, wherein the gateway node is configured to ignore at least one node for the purposes of the optimization calculation, based on at least one of the following criterion:

i. a lightly loaded node;

ii. a relatively remote node;

iii. a node that introduces an unacceptable complexity into the optimization calculation; and directs said at least one node to communicate through a neighboring node.

18. The apparatus as set forth in claim 17, wherein the decision to force said at least one node to form a link via its neighbor can be ordered by at least one of the following:

i. the gateway node with a centralized protocol ii. a distributed protocol wherein said at least one node itself may query its neighbors and elect to use a relay node rather than to contact the gateway directly.

19. An apparatus for increasing performance in a hybrid, non-terrestrial to terrestrial multi-hop mobile wireless network comprising:

a first wireless cluster including the following elements:

i. a first plurality of mobile nodes; and ii. a first gateway node;

where the first plurality of mobile nodes are communicatively linked to the first gateway node;

a second wireless cluster including the following elements:

i. a second plurality of mobile nodes; and ii. a second gateway node;

where the second plurality of mobile nodes are communicatively linked to the second gateway node;

a communications link between the nodes in the first wireless cluster and the nodes in the second wireless cluster that sequentially directs data through:

i. the first gateway node;

ii. a satellite: and iii. the second gateway node, wherein the wireless ad-hoc network is sub-divided into a cluster of smaller wireless ad-hoc networks and additional gateways are introduced to reduce the computational complexity of the optimization calculation.

* * * * *